(12) United States Patent
Umapathy et al.

(10) Patent No.: US 8,868,785 B1
(45) Date of Patent: Oct. 21, 2014

(54) METHOD AND APPARATUS FOR DISPLAYING MULTIMEDIA CONTENT

(75) Inventors: Thangaraj Umapathy, Karnataka (IN); Akshaya Gowrishanker, Karnataka (IN); Jeetu Narayan, Karnataka (IN); Ramprakash Raghupathy, Chennai (IN); Srikumar Sankaran, Karnataka (IN); Sudhir Tubegere Shankaranarayana, Karnataka (IN); Vijaya Senthil Veeri Chetty, Tamilnadu (IN)

(73) Assignee: Adobe Systems Incorporated, San Jose, CA (US)

( * ) Notice: Subject to any disclaimer, the term of this patent is extended or adjusted under 35 U.S.C. 154(b) by 678 days.

(21) Appl. No.: 12/658,302

(22) Filed: Feb. 11, 2010

(51) Int. Cl.
  *G06F 15/16*   (2006.01)
(52) U.S. Cl.
  USPC ........... 709/246; 709/217; 709/219; 709/224; 725/110; 725/113
(58) Field of Classification Search
  USPC ........... 709/224, 246, 219, 217; 725/113, 110
  See application file for complete search history.

(56) References Cited

U.S. PATENT DOCUMENTS

| | | | |
|---|---|---|---|
| 6,882,349 B2 | 4/2005 | Doyle | |
| 2006/0041685 A1* | 2/2006 | Bracewell et al. | 709/246 |
| 2006/0150224 A1 | 7/2006 | Kamariotis | |
| 2007/0028278 A1* | 2/2007 | Sigmon et al. | 725/113 |
| 2007/0162568 A1* | 7/2007 | Gupta et al. | 709/219 |
| 2008/0092172 A1 | 4/2008 | Guo et al. | |
| 2008/0126476 A1 | 5/2008 | Nicholas et al. | |
| 2008/0195698 A1* | 8/2008 | Stefanovic et al. | 709/203 |
| 2008/0228865 A1 | 9/2008 | Cruzada | |
| 2009/0307081 A1* | 12/2009 | Rabbitt et al. | 705/14.42 |
| 2010/0281042 A1* | 11/2010 | Windes et al. | 707/756 |
| 2011/0060998 A1* | 3/2011 | Schwartz et al. | 715/738 |

FOREIGN PATENT DOCUMENTS

WO  WO2008/059510 A2  5/2008
WO  WO2008/059511 A2  5/2008

OTHER PUBLICATIONS

Yang, Chun et al., "A Fast and Efficient Codec for Multimedia Applications in Wireless Thin-Client Computing,"© 2007 IEEE, pp. 1-12.
Fan, Xin et al., "Looking into Video Frames on Small Displays", MM'03, Nov. 2-8, 2003, Berkeley, California, U.S.A., pp. 1-4.

\* cited by examiner

*Primary Examiner* — Hitesh Patel
(74) *Attorney, Agent, or Firm* — Moser Taboada

(57) ABSTRACT

A method and apparatus for displaying multimedia content on a display device is disclosed. In one embodiment, a computer implemented method receives a web page comprising multimedia content for display upon a display device and detects non-displayable content within the multimedia content. Upon detecting the non-displayable content, the method requests transcoding for only the non-displayable content and receives multimedia data transcoded from the non-displayable content. The method displays the web page using content decoded from the multimedia data to replace the non-displayable content.

16 Claims, 13 Drawing Sheets

METHOD AND APPARATUS FOR DISPLAYING MULTIMEDIA CONTENT

BACKGROUND

1. Field

Embodiments described herein generally relate to multimedia content management and, more particularly, relate to a method and apparatus for displaying multimedia content on a display device.

2. Description of the Related Art

Rapid proliferation of content available via the Internet has resulted in widespread use of the Internet. Internet users spend a significant amount of time browsing the Internet to communicate with other users, to conduct various search related activities, execute applications, and the like. Such increase in Internet use has led more and more users to access Internet resources (e.g., web pages, multimedia clips and/or content, emails and/or the like) via mobile devices (e.g., a mobile phone, an electronic book reader, a Personal Digital Assistant (PDA), a hand-held gaming device and/or the like).

Generally, rich multimedia content available from animated and/or interactive websites via the Internet requires significant computing resources (e.g., relatively fast processor, substantial memory size and/or the like) to facilitate smooth rendering and display of such rich multimedia content. In many instances, display devices, such as mobile devices, have limited computing resources. Consequently, some types of display devices (e.g., mobile devices) are unable to display rich multimedia content available from certain websites due to insufficient computing resources. In particular, display devices with sufficient computing capability may render streaming multimedia content provided in a SWF file format (e.g. the SWF File Format Specification (Version 10) by Adobe Systems Incorporated of San Jose, Calif.) using FLASH® Player software (FLASH is a registered trademark of Adobe Systems Incorporated). However, display devices with insufficient computing resources cannot display content from a SWF file nor can these devices execute FLASH Player software.

Conventionally, various techniques are available to improve the display of multimedia content specifically for mobile devices, especially cell phones and personal digital assistants. For example, entire websites may be designed for use by mobile devices such that when a mobile device accesses a given website, only the mobile formatted pages are sent to the mobile device. The mobile formatted pages typically have the rich content removed. In another technique, upon request by a mobile device, an entire website may be processed to reformat each page of the website for mobile device viewing. Alternatively, each page of a website, as the pages are requested by a mobile device, may be reformatted for mobile device viewing. These techniques consume substantial resources to store reformatted pages, reformat entire websites or reformat the pages as they are requested.

Therefore, there is a need in the art for a method and apparatus for displaying multimedia content on a display device, especially when the display device has limited computing resources.

SUMMARY

A method and apparatus for displaying multimedia content on a display device is disclosed. In one embodiment, a computer implemented method receives a web page comprising multimedia content for display upon a display device and detects non-displayable content within the multimedia content. Upon detecting the non-displayable content, the method requests transcoding for only the non-displayable content and receives multimedia data transcoded from the non-displayable content. The method displays the web page using content decoded from the multimedia data to replace the non-displayable content.

Figure 1:
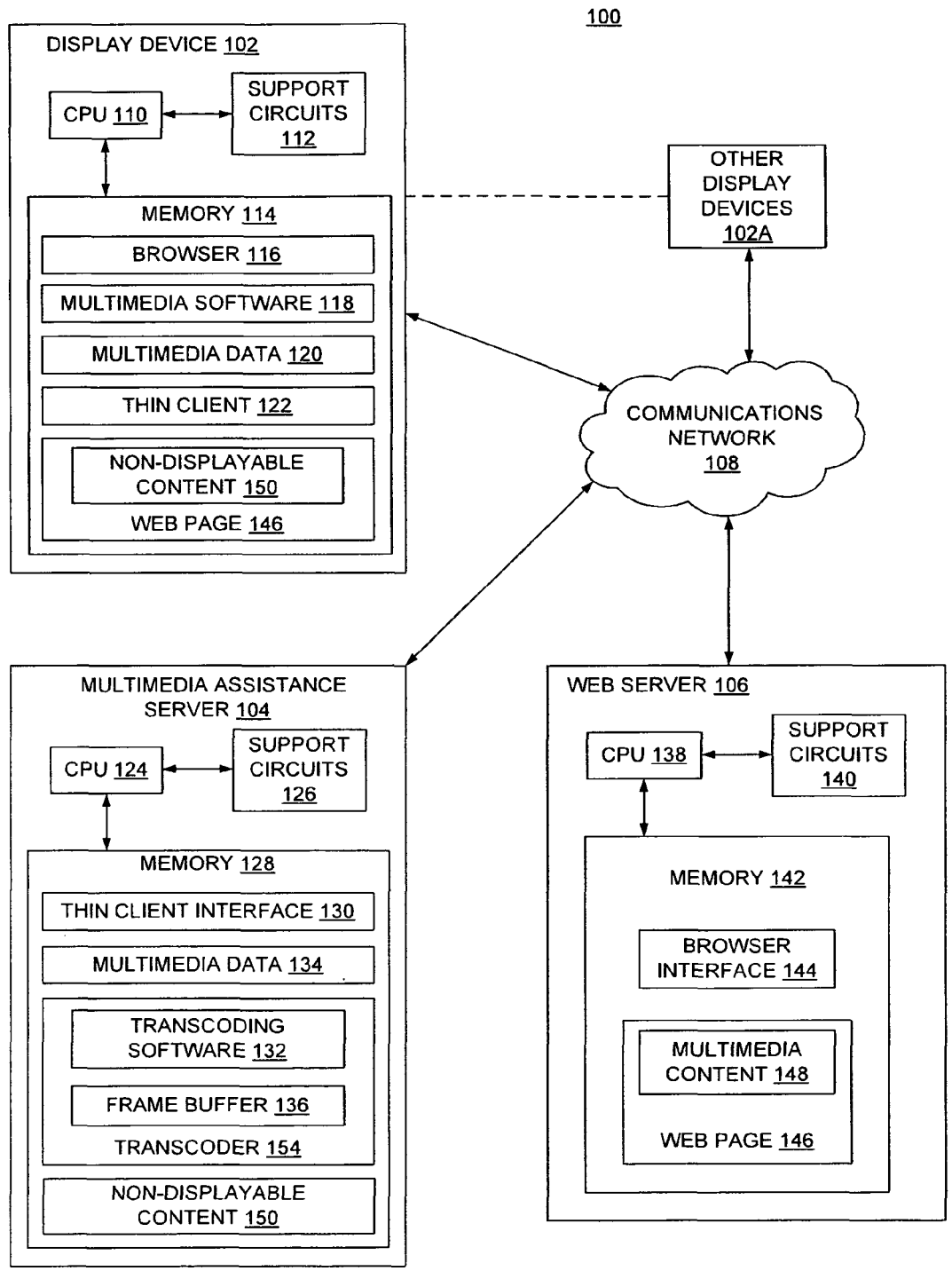
FIG. 1 is a block diagram of apparatus for providing multimedia content to a display device and displaying the multimedia content, according to one or more embodiments.

While a method and apparatus for displaying multimedia content on a display device is described herein by way of example for several embodiments and illustrative drawings, those skilled in the art will recognize that the method and apparatus is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for displaying multimedia content on a display device are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of apparatus 100 (generally forming a system) for supplying multimedia content to and displaying multimedia content on a display device, according to one or more embodiments. The apparatus 100 comprises one or more display devices 102, a multimedia assistance server 104, and a web server 106, each coupled to one another through a communication network 108.

The display device 102 is a type of a computing device (e.g., a mobile phone, a Personal Digital Assistant (PDA), hand-held gaming device, electronic document/book reader and/or the like). The display device 102 may be utilized by a user to access various Internet resources (e.g., web pages, multimedia files (e.g., dynamic or static content in the form of images, video and/or audio), online services (e.g., social networking, applications, databases and/or the like). In one embodiment, the display device 102 may have insufficient computing resources (e.g., processing capability, memory resources, display capability, lack of certain multimedia drivers, inability to execute certain multimedia display drivers and/or the like) to effectively display rich multimedia content available from various Internet resources. Using various embodiments described in the present disclosure, the multimedia content of such Internet resources can be displayed on the display device 102.

The display device 102 generally comprises a central processing unit (CPU) 110, support circuits 112, and memory 114. The support circuits 112 support the functionality of the CPU 110 and include such circuits as clock circuits, power supplies, cache, buses, network interface circuits, and/or the like. The memory 114 stores a browser 116, multimedia software 118, multimedia data 120, a web page 146 containing non-displayable content 150, and a thin client 122. One embodiment of computing system hardware that can be used as a display device 102 is described in detail below with respect to FIG. 13.

The display device 102, by executing the browser 116 using the CPU 110, interacts with the web server 106. According to one or more embodiments, the browser 116 includes a software application for accessing Internet resources (e.g., domain names, Uniform Resource Locators (URLs), and/or the like) and displays content associated with the Internet resources on the display device 102. The resources may further be identified through Uniform Resource Identifier (URI) and/or may be graphics, images, video, text, audio or other piece of content (collectively referred to herein as a web page such as web page 146). The browser 116 may include, but is not limited to, WINDOWS INTERNET EXPLORER (IE), MOZILLA FIREFOX, APPLE SAFARI, GOOGLE CHROME, OPERA, INTERNET EXPLORER MOBILE, jB5, WebOS, OPERA MOBILE, and/or the like. The browser 116 further includes browser related software, for example, the multimedia software 118 (e.g., FLASH Player software plug-in), configured to provide additional functionalities to the browser (e.g., an add-on, plug-in or extension) that facilitates web browsing and content rendering in accordance with one or more embodiments of the invention. Furthermore, the term "browser" is intended to include any software, application, web tool, applet, widget and/or the like that can be used to render multimedia content for display.

According to one or more embodiments, the multimedia software 118 (e.g., FLASH Player software) includes software code (e.g., processor executable instructions) configured to display content on the display device 102. In an embodiment, the browser 116 may execute the multimedia software 118 (i.e., as a plug-in, add-on, applet, widget, and/or the like) to facilitate display and interactivity of the multimedia content.

In one or more embodiments, the web page 146 includes content (e.g., audio, video, images, text, graphics and/or the like) to be presented to a user via the display device 102. In an embodiment, the web page 146 may comprise non-displayable content 150 that cannot be displayed because of limitations of the computing capability, memory capability or display capability (i.e., collectively referred to as limited to computing resources) of the display device 102. The content 150 that cannot be displayed comprises content that does not appear on the display device, content that appears slowly on the display device, content that is poorly displayed on the display device, content having inoperative or reduced operative interactivity, and/or the like. In a broad sense, such non-displayable content 150 is herein defined as content that does not meet the expectations of a user/viewer of the content using the display device 102. More specifically, the non-displayable content 150 may be contained within a FLASH object (e.g., a SWF file to be executed to display content within a region on the web page 146) that, upon execution or attempted execution by the CPU 110 of the display device 102, cannot be displayed, is displayed poorly, has reduced or inoperative interactivity, and/or the like.

According to one or more embodiments, the thin client 122 is launched along with the browser 116 and is used by the display device 102 to display content that would otherwise be non-displayable. In an alternative embodiment, the thin client 122 is launched upon detection of non-displayable content 150 within the web page 146. Consequently, upon detecting non-displayable content (e.g., "rich" multimedia content such as that contained in a SWF file) within the web page 146, the display device 102 utilizes the thin client 122 to facilitate display of the non-displayable content using one or more embodiments disclosed herein. Utilizing the thin client 122, the display device 102 communicates with the multimedia assistance server 104 to request transcoding services for the non-displayable multimedia content 150 (e.g., request remote execution of the non-displayable Flash content). The thin client 122 interacts with the multimedia assistance server 104 to have the non-displayable content 150 transcoded into multimedia data 120 having a file format that can be processed and displayed using the multimedia software 118 and using the limited computing resources of the display device 102. The thin client 122 forms at least one proxy layer through which communications (data messages) from the browser 116 are coupled to the multimedia assistance server 104 and communications (data messages) from the multimedia assistance server 104 are coupled to the browser 116 (or any other component of the display device 102). Various embodiments of a method used to perform the transcoding process as well as perform the communication between the multimedia assistance server 104 and the display device 102 are described below.

The web server 106 is a type of computing system for providing various web-based applications and services. The web server 106 generally comprises a CPU 138, support circuits 140, and memory 142. The support circuits 140 support the functionality of the CPU 138 and include such circuits as clock circuits, power supplies, cache, buses, network interface circuits, and/or the like. The memory 142 stores a browser interface 144 and a web page 146. The web page 146 comprises multimedia content 148. One embodiment of computing system hardware that can be used as a web server 106 is described in detail below with respect to FIG. 13.

According to one or more embodiments, the browser interface 144 operates as an interface between a browser (i.e., the browser 116) and the web server 106. The browser interface 144 may be a Graphical User Interface (GUI), a Command Line Interface (CLI) and/or other user interface that facilitates communication between the browser 116 and the web server 106.

According to one or more embodiments, the web page 146 includes one or more files associated with a web site. The web page 146 may be static or dynamic in nature (e.g., a Hyper Text Markup Language (HTML) page, an Extensible Markup Language (XML) page and/or the like and includes embedded content, such as FLASH objects capable of being rendered from a SWF file contained within or addressed from the web page).

In one or more embodiments, some or all of the multimedia content 148 (e.g., audio, video, images and/or the like) contained within the web page 146 cannot be displayed, on some types of display devices 102 because of one or more inadequacies in the design or operation of the display device 102. Such content is referred to herein as non-displayable content 150 when downloaded to a display device that cannot properly display the content. Usually, the web server 106 sends the web page 146 and its multimedia content 148 to the browser 116 of the display device 102. The browser 116 assembles the web page 146 for display on the display device 102. If non-displayable content 150 is included in the web page, transcoding of the content is requested as described below. Although the web server 106 is depicted as a single server providing the web page, the web page content may be provided by multiple web servers. As such, the web server 106 should be considered representative of one or more web servers that may provide the content 148 to form the web page 146.

The multimedia assistance server 104 is a type of computing system that provides various web-based services including transcoding of non-displayable content 150. The multimedia assistance server 104 generally comprises a CPU 124, support circuits 126, and memory 128. The support circuits 126 support the functionality of the CPU 124 and include such circuits as clock circuits, power supplies, cache, buses, network interface circuits, and/or the like. The memory 128 stores a thin client interface 130, multimedia data 134, non-displayable content 150, and a transcoder 154 comprising transcoding software 132 and a frame buffer 136. One embodiment of computing system hardware that can be used as a multimedia assistance server 104 is described in detail below with respect to FIG. 13.

According to one or more embodiments, the thin client interface 130 may be a Graphical User Interface (GUI), a Command Line Interface (CLI) and/or other user interface that facilitates communication between the thin client 122 and the multimedia assistance server 104. For example, the display device 102 may utilize the thin client 122 to request the multimedia assistance server 104 to perform transcoding of the non-displayable content 150.

According to one or more embodiments, the transcoder 154 comprises transcoding software 132 and a frame buffer 136. The transcoding software 132 includes software code (e.g., processor executable instructions) that is configured to perform transcoding as described below. In one embodiment, the thin client 122 communicates details of any interaction between the browser 116 and the non-displayable content (e.g., a SWF object) such that the thin client 122 facilitates remotely rendering the non-displayable content on the multimedia assistance server 104. In response to a need for transcoding, the multimedia assistance server 104 requests the non-displayable content 150 from the web server 106. Upon receipt of the content 150, the transcoding software 132 plays the multimedia content 148 into the frame buffer 136. The transcoding software 132 then periodically scrapes the frame buffer 136 to create a simple sequence of audio/video frames that are encoded to form multimedia data 134 (e.g., in one embodiment the multimedia data is an audio/visual (NV) stream). The multimedia data 134 is sent to the display device 102 where it is received and coupled to the multimedia software 118. The multimedia software 118 decodes and displays the multimedia data in place of the rich multimedia content (e.g., the non-displayable content 150).

The multimedia assistance server 104 controls the transcoder 154 using any interaction events that may occur at the display device 102 such that the frame buffer information changes in accordance with the interaction events. Examples of the interaction events include, but are not limited to, stop, play, pause, fast forward, rewind, zoom and/or the like. The updated frame buffer 136 is scraped and the multimedia data 134 is created and sent to the display device 102. In this manner, a user may interact with the multimedia software 118 in a conventional manner, while the commands are acted upon at the multimedia assistance server 104.

The communications network 108 comprises a communication system that connects computers by wire, cable, fiber optic and/or wireless link facilitated by various types of well-known network elements, such as hubs, switches, routers, and the like. The communications network 108 may employ various well-known protocols to communicate information amongst the network resources. For example, the communication network 108 may be a part of the Internet or Intranet using various communications infrastructure, such as Ethernet, WiFi, WiMax, General Packet Radio Service (GPRS), and the like.

The transcoding services provided by the transcoder 154 may be provided to a plurality of display devices 102 (as represented by the block labeled other display devices 102A). The transcoder 154 may be representative of a plurality of transcoders, each of which may be time shared amongst the display devices 102, 102A, or a virtualization technique may be used to provide transcoding services to various display devices on a temporarily, dedicated basis using virtual transcoders.

Figure 2:
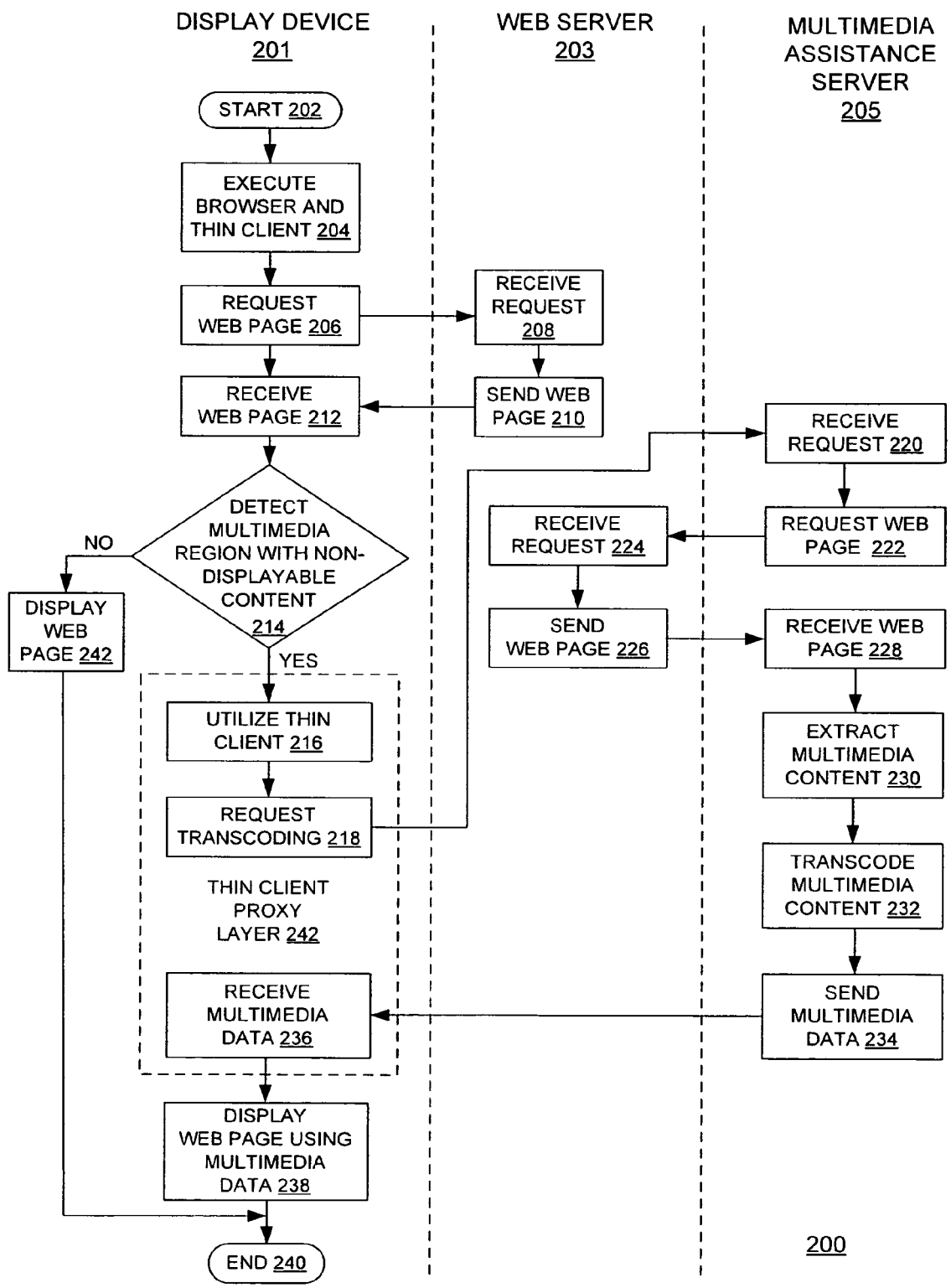
FIG. 2 depicts a flow diagram of a method used to communicate between a display device, a web server and a multimedia assistance server, according to one or more embodiments.

FIG. 2 illustrates a flow diagram of a method 200 used in communication between a display device (e.g., display device 102 in FIG. 1), the web server (e.g., web server 106 in FIG. 1) and the multimedia assistance server (e.g., multimedia assistance server 104 in FIG. 1) according to one or more embodiments. For clarity, operations performed by the display device are depicted in column 201, operations performed by the web server are listed in column 203, and operations performed by the multimedia assistance server are listed in column 205.

The method 200 starts at step 202 and proceeds to step 204, at which a display device executes a browser and a thin client. In one embodiment, a user of a display device (e.g., the display device 102 of FIG. 1) may manipulate the display device causing execution of the browser (e.g., the browser 116 of FIG. 1). In one embodiment, the thin client (e.g., the thin client 122 of FIG. 1) launches when the browser is launched. In an alternative embodiment, the thin client launches when the display device receives non-displayable content (e.g., non-displayable content 150 of FIG. 1) as described below. At step 206, the browser requests a web page. In one embodiment, the browser requests a web page (e.g., the web page 146 of FIG. 1) from a web server (e.g., the web server 106 of FIG. 1). According to one or more embodiments, the display device by executing the browser interacts with the browser interface (e.g., the browser interface 144 of FIG. 1); the browser interface performs as an interface between the browser and the web server to access and communicate the requested web page to the display device. At step 208 and step 210 respectively, the web server receives the web page request and sends the web page to the display device.

At step 212, the display device receives the requested web page from the web server. At step 214, the method 200 queries whether the web page contains a multimedia region with non-displayable content. If no such content exists, the method 200 proceeds to step 242 to display the web page as delivered from the web server. The method 200 ends at step 240. In an embodiment, at step 214, the multimedia software (e.g., software 118 of FIG. 1) detects the existence of non-displayable content. In one embodiment, the browser may determine that the web page contains rich multimedia content (e.g., a SWF file or a link to a SWF file) that is known to be incompatible with the display device, e.g., a driver for processing the multimedia content does not exist. In one embodiment, the browser couples the information regarding the file type to the multimedia software where the file type is deemed a type that cannot be displayed on the display device. In an alternative embodiment, the display device may access the Internet through a proxy server, where the proxy server detects non-displayable content based upon information from the display device, e.g., model number. The proxy server may instantiate a transcoding process for the non-displayable content. In another embodiment, the display device reads the header of the content to determine whether the device has the capability to render the content or not. In a further embodiment, the display device may log any content that creates a rendering error as non-displayable content. With each need to render content, the display device accesses the log to determine if the newly received content is non-displayable. In this manner, the display device "learns" which content is non-displayable. A server may also periodically update the log with identification information of known non-displayable content associated with the particular display device. Other display devices may automatically report such non-displayable content identification to the server or users may manually report such non-displayable content identification.

At step 216, if non-displayable content is detected, the method 200 utilizes the thin client to handle multimedia content processing for the non-displayable content. At step 218, the thin client requests transcoding for the non-displayable content from the multimedia assistance server. Upon utilizing the thin client, the display device communicates with the multimedia assistance server to request transcoding services for the specific multimedia content (e.g., sending browser communications and content identification information).

At step 220, the multimedia assistance server receives the transcoding request from the thin client. At step 222, in one embodiment, the multimedia assistance server requests the web page from the web server. At step 224 and 226 respectively, the web server receives the web page request and sends the web page to the multimedia assistance server. In an alternative embodiment, the multimedia assistance server requests only the non-displayable content. Such a request may be via a specific universal resource locator (URL), specifying a content file name, and/or the like.

At step 228, the multimedia assistance server receives the web page from the web server 106. In an embodiment, the multimedia assistance server may either receive an entire web page or only specific multimedia content from the web server. For example, the display device may send a URL for the specific multimedia content to the multimedia assistance server, and the multimedia assistance server then requests the content from the web server without the remainder of the page. In one embodiment, the multimedia content comprises one or more FLASH objects and the multimedia assistance server uses a URL and an md5 code to identify the files to be sent from the web server.

Figure 4:
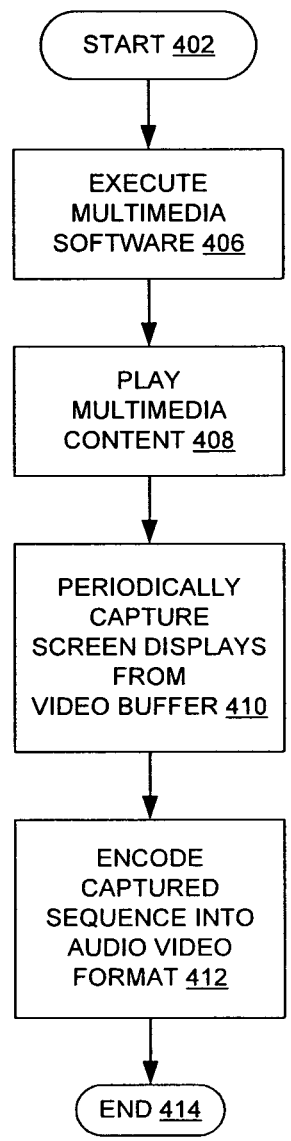
FIG. 4 depicts a flow diagram of a method of transcoding multimedia content, according to one or more embodiments.

At step 230, the multimedia content is extracted from the page, if necessary. At step 232, the multimedia content is transcoded. The transcoding process converts the non-displayable content (content 150 in FIG. 1) into multimedia data (data 134 of FIG. 1) having a format that can be displayed using the limited computing resources of the display device. FIG. 4 and the related text describe a specific embodiment of the transcoding process.

At step 234, the method 200 sends transcoded content (multimedia data) to the display device. The multimedia data is identified within a transport stream to enable the multimedia software of the display device to display the content in the correct location of the web page. In one embodiment, the transport protocol is Real Time Messaging Protocol (RTMP) or another equivalent protocol. Using, for example, RTMP enables the multimedia data to be streamed from the multimedia assistance server to the display device (i.e., downstream communications) as well as communicate to the multimedia assistance server display device hardware details, browser communication information, local webpage elements, user interaction events, and/or the like (i.e., upstream communications). Steps 216, 218 and 236 form a thin client proxy layer 242 that facilitates communications between the multimedia assistance server and the display device. This proxy layer 242 instantiates a transcoding session as well as communicates information and performs operations that are necessary for the transcoder to remotely render the non-displayable content.

At step 236, the display device receives the multimedia data. At step 238, the multimedia software decodes the multimedia data and displays the content within the web page on the display device. In an embodiment, the multimedia software 118 displays an A/V sequence in place of the non-displayable multimedia content. The method 200 proceeds to step 240 at which the method 200 ends.

In this manner, a web page comprising otherwise non-displayable content can receive and display the content in a simpler form. The simple form is compatible with display devices having limited computing resources. Consequently, in one specific embodiment, a display device that is incapable of displaying rich content of a FLASH object by directly executing the SWF file for the object, can display the same content using the transcoding services of the multimedia assistance server. The transcoding services create multimedia data in such standard formats as MPEG-2, JPEG, MPEG-4 and the like, or custom formats such as a custom SWF format discussed below with respect to FIG. 5. These formats can be displayed using a simple A/V data decoder or multimedia software specifically designed to interact with custom format multimedia data. In another embodiment, various unsupported content types (e.g., proprietary content), may be remotely transcoded into a SWF file format, where a FLASH Software player is used at the display device for rendering the transcoded content as FLASH content.

Figure 3:
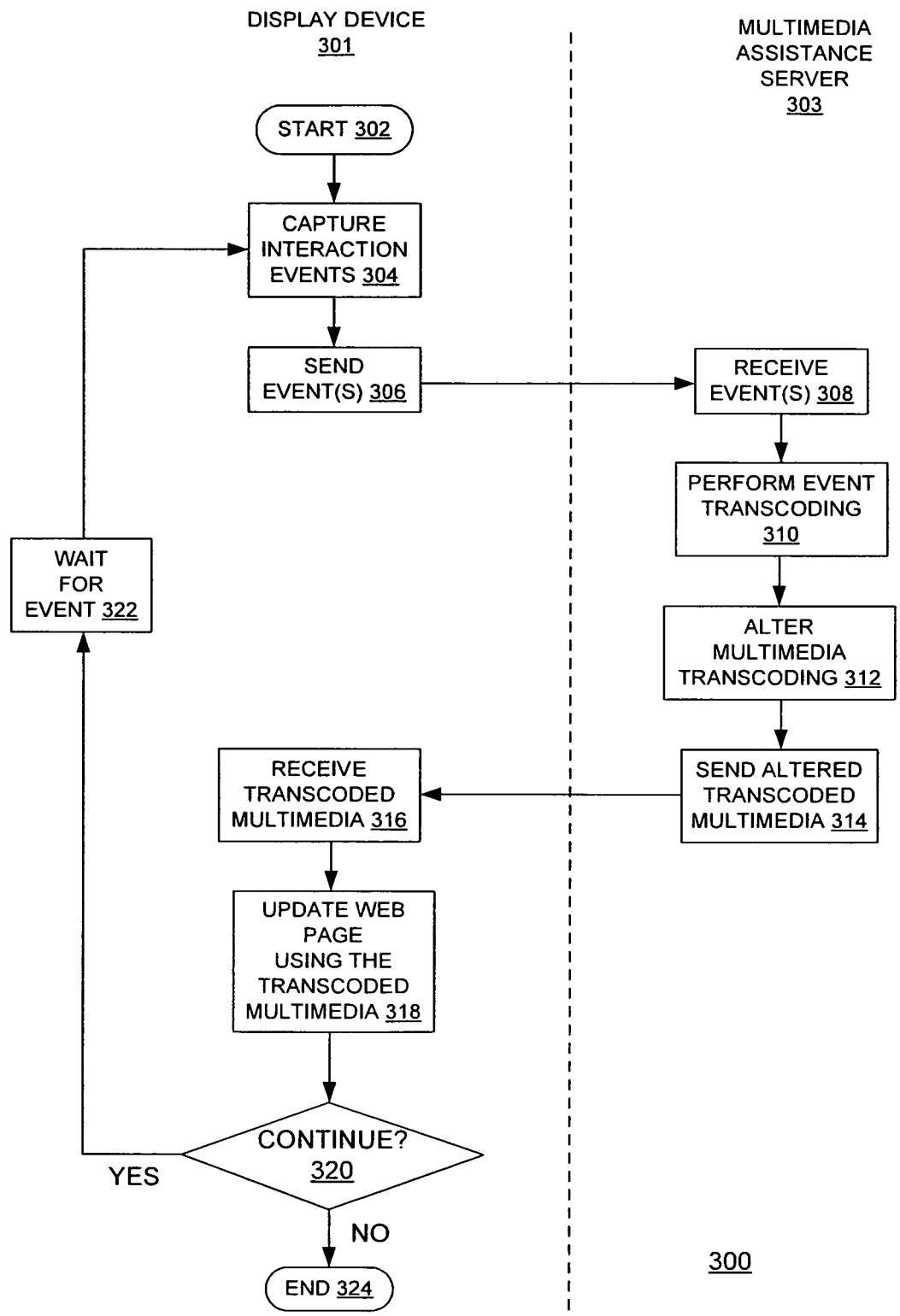
FIG. 3 depicts a flow diagram of a method for capturing and utilizing interaction events to control the display of multimedia content, according to one or more embodiments.

FIG. 3 illustrates a flow diagram of a method 300 for utilizing interaction events usually associated with rich content with a simple form of content, according to one or more embodiments. For clarity, operations performed by a display device (e.g., display device 102 of FIG. 1) are depicted in column 301, and operations performed by a multimedia assistance server (e.g., the multimedia assistance server 104 of FIG. 1) are listed in column 303.

The method 300 starts at step 302 and proceeds to step 304, wherein at least one interaction event is captured. In an embodiment, the thin client (e.g., thin client 122 of FIG. 1) captures the at least one interaction event. Interaction events comprise, but are not limited to, play, stop, pause, fast forward, reverse, scroll, zoom and/or the like. These events are typically the operations used to control the display of rich content. Thus, in one embodiment, as a user moves a pointer to a specific location on a screen and selects (clicks) the operation associated with the location, the thin client captures the interaction event. Other interaction events may result from mouse navigation, trackball navigation, track pad navigation, touch screen navigation, keyboard navigation including, but not limited to TAB key navigation, arrow key navigation, and/or the like. Interaction events also comprise interactions that are required between the non-displayable content (remotely executing on the multimedia assistance server) and hardware/software of the display device. Such interactions (as described in detail with respect to FIGS. 6, 7, 8 and 9) comprises browser calls, calls for information, calls for interaction with memory, calls for interaction with other content, and/or the like.

At step 306, the display device sends the at least one interaction event to the multimedia assistance server. In an embodiment, the thin client captures all interaction events performed on the display device to control the multimedia content being displayed from transcoded content (e.g., multimedia data 134 of FIG. 1) and the thin client sends the captured events to the multimedia assistance server.

At step 308 and 310 respectively, the multimedia assistance server receives the interactivity events and, upon receiving interaction events, performs the event transcoding. In an embodiment, the multimedia assistant server performs the event transcoding such that a transcoder (e.g., transcoder 154 of FIG. 1) alters the multimedia transcoding process (as shown in step 312) to create altered multimedia data. In an embodiment, the transcoder controls the transcoding software using the interaction events such that information in the frame buffer will change in accordance with the interaction events. In one embodiment, a portion of the transcoding software (e.g., FLASH Player software) is provided the event (e.g., switching from play to pause). In response to the event, the content playing into the frame buffer is paused and the paused frames are scraped, encoded and sent to the display device. Such a process will provide an illusion of local content control at the display device. This procedure—perform event using the transcoding software, capture changed frames, encode and send—can be utilized for any of the interactive functions commonly associated with display of rich content.

At step 314, the multimedia data reflecting the interactivity event is sent to the display device. At step 316 and 318 respectively, the display device received the multimedia data and updates the displayed web page.

At step 320, a determination is made whether the method 300 should wait for more interaction events, i.e., the content is actively being displayed on the web page. If is the method 300 determines that additional interaction events (option "YES") may occur, the method 300 proceeds to step 322, at which the method 300 will continue waiting for the additional events to be captured and then proceed to step 304. If the method 300 determines that no further interaction events (option "NO") may occur (e.g., the content has ceased being displayed), the method 300 proceeds to step 324, at which the method ends.

FIG. 4 illustrates a flow diagram of a method 400 for transcoding multimedia content, according to one or more embodiments. In one embodiment, this method 400 is performed within step 232 of FIG. 2 above. As such, with respect to method 400, the non-displayable content has been received by the multimedia server (e.g., multimedia server 104 of FIG. 1) and is available to its transcoder (e.g., transcoder 154 of FIG. 1). The method 400 starts at step 402 and proceeds to step 406, wherein the method 400 executes transcoding software (e.g., transcoding software 132 of FIG. 1). At step 408, the transcoding software plays the non-displayable multimedia content that has previously been extracted from a web page or is downloaded separately as described with respect to FIG. 2. The transcoding software plays the content into a frame buffer (e.g., the frame buffer 136 of FIG. 1).

At step 410, the method 400 periodically captures "screen displays" from frame buffer, i.e., a sequence of video frames and related audio are captured. At step 412, captured sequence is encoded into a standard audio/video format (i.e., a simple form of multimedia data (e.g., multimedia 134 of FIG. 1)). The transcoding software 132 maintains synchronization between the audio and video data. Alternatively, other transcoding techniques may be used for converting rich multimedia content (e.g., FLASH content) into an NV format that can be displayed on most display devices. In one embodiment, the sequence of screen displays is encoded to form an audio/video stream such as MPEG, MPEG-2, MPEG-4, and so on. Upon completion of the encoding process, the method 400 proceeds to step 414, where the method 400 ends. In some embodiments, the multimedia data is streamed to the display device over a period of time such that the method 400 is repeatedly utilized to play, scrape and encode content as segments for transmission to a display device. The segments are reassembled into a sequence of NV frames for display at the display device.

Figure 5:
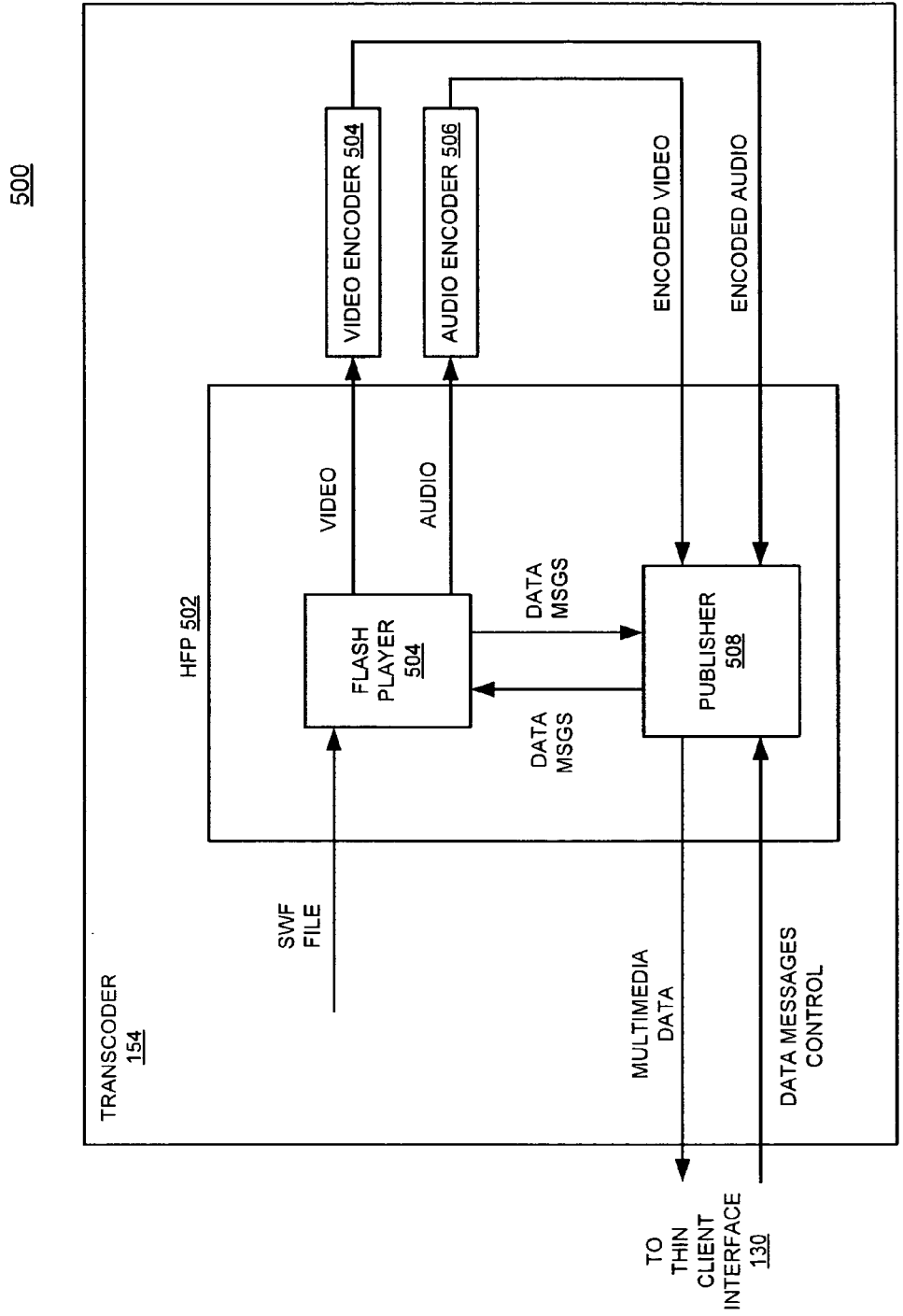
FIG. 5 depicts a block diagram of a specific embodiment using a headless FLASH player (HFP) within a multimedia assistance server, according to one or more embodiments.

FIG. 5 depicts a block diagram of a specific embodiment of a transcoder (e.g., transcoder 154 of FIG. 1) using a headless FLASH player (HFP) 502 to perform transcoding. The transcoder 154 is operatively coupled to a thin client interface (e.g., the thin client interface 130 of FIG. 1). More specifically, the transcoder 154 comprises a Headless FLASH Player (HFP) 502, a video encoder 504, and an audio encoder 506. The headless FLASH player 502 is referred to as "headless" because it does not contain the high level functions and interface structure usually associated with a FLASH player. The HFP 502 is arranged to play SWF files provided to the HFP, where the HFP 502 comprises a publisher 508 and a flash player 510.

In one embodiment, a SWF file is extracted from a web page or otherwise received from the network (e.g., network 108 of FIG. 1). As mentioned previously, the SWF file may be requested using a URL and an md5 code to identify the specific SWF file that forms the non-displayable content. The SWF file is coupled to the FLASH player 510. The FLASH player 510 "plays" the content to form a sequence of video frames (video) and analog audio (audio). The video is coupled to a video encoder 504 and the audio is coupled to the audio encoder 506. The video encoder 504 comprises a frame buffer (internal to the encoder in this embodiment) to temporarily store video frames as the video is encoded. The audio and video encoders may encode the audio and video into one or more standard formats including MPEG-2, MPEG-4, JPEG, h.264, MP3, and/or the like. Alternatively, the encoders may create a custom version of a FLASH file, herein referred to as a custom SWF file (i.e., a proxy flash content that can be rendered using the thin client and related multimedia software (e.g., thin client 122 and multimedia software 118)).

Typical FLASH content makes use of several APIs, such as External Interface, Local Connection, Shared Object and the like, to interact with a browser, device storage or other FLASH content within a display device environment. FLASH content within a custom SWF file using typical FLASH content capabilities would fail to operate without a synchronization mechanism between the transcoder and the thin client. As such, as the custom SWF file is executed at the display device, the thin client constantly communicates with the transcoder 154 to synchronize calls, device storage and browser interaction events. These interaction events are captured by the thin client and sent to the transcoder 154 as described above with respect to FIG. 3 as well as FIGS. 6, 7, 8 and 9 below. Accordingly, in this embodiment, the thin client and multimedia software in the display device execute the custom SWF file and the display device behaves in a manner reflecting the intended use of the original SWF file (non-displayable content) and replicates the experience as though the user is interacting with the SWF file content locally on the display device.

In one embodiment, when the HFP encounters the interactivity events, it creates a data message with the necessary update information and sends the messages to the thin client via a Real Time Messaging Protocol (RTMP) channel. The thin client is authored with a call back function that is registered to receive these data messages from the RTMP channel. The thin client appropriately handles the event, performs the necessary action and creates/sends a response data message back to the multimedia assistance server via the same RTMP channel. Once the multimedia assistance server receives the response, the server knows that the display device multimedia software is synchronized to handle local events on the display device itself.

For example, in one embodiment, when the original SWF content (non-displayable content) encounters an ExternalInterface.addCallback to register an action script function for calling the content from a JAVA script, the HFP 502 sends that information as a data message to the thin client via the RTMP channel. The thin client receives the data message, retrieves the information from the data message and creates the proxy JAVA script function for the corresponding SWF object. The proxy JAVA script function along with a generic action script function will then have the necessary capability to receive/handle an incoming call from the device browser JAVA script code and then to forward it to the HFP 502.

Similarly for shared objects, the storage and retrieval of shared objects also requires special handling since the SWF file is being played remotely on the multimedia assistance server by the HFP 502. The data related to shared object storage and retrieval is periodically updated at specific intervals during the browsing session of the content.

More generally, the encoded audio and video is coupled to the publisher 508. Depending on the type of encoded A/V data used, the publisher 508 synchronizes the transmission of the encoded audio and video (NV) data with the display device thin client as discussed above. The publisher 508 sends the NV data to the thin client interface 130 as a sequence of data messages. In addition, the publisher 508 receives data messages from the thin client interface 130. These data messages contain interactivity event information and synchronization information for the FLASH player 510. The incoming data messages are coupled to the FLASH player to implement an interactivity event. The FLASH player responds to the data message by altering the video and audio output in accordance with the event. An acknowledgement message may be generated and coupled from the player 510 to the publisher 508. The publisher 508 may include the acknowledgement in the multimedia data for use by the thin client interface, thin client, or the multimedia software. In this manner, a headless FLASH player can be used to provide transcoding services in accordance with one embodiment. Other rich content can be transcoded in a similar manner using players for the specific form of non-displayable content.

FIGS. 6, 7, 8 and 9 depict flow diagrams of specific embodiments of various methods of utilizing the embodiment of FIG. 5 to perform remote execution of FLASH content using an HFP (e.g., HFP 502 of FIG. 5) and utilize a proxy for the FLASH content on a display device (e.g., display device 102 executing a thin client 122 of FIG. 1). More specifically, these flow diagrams represent "use cases" involving typical functions of. FLASH Player software that, in various embodiments, are remotely executed using the HFP of FIG. 5. In these use cases, the thin client communicates with a FLASH media server in lieu of the more generic web server described above. In other embodiments, the FLASH media server may be one in the same as the multimedia assistance server 104 of FIG. 1. Such communication facilitates coupling the FLASH content from the FLASH media server to the HFP. The following description assumes that these use cases occur after the HFP has created an instance for remotely executing a SWF file. Each use case describes an operation or operations that may occur while the FLASH content is being rendered to the frame buffer within a transcoder. The following flow diagrams utilize the FLASH media server as a communication conduit between the thin client and the HFP; however, in other embodiments, the thin client may communicate directly with the HFP in the multimedia assistance server.

Figure 6:
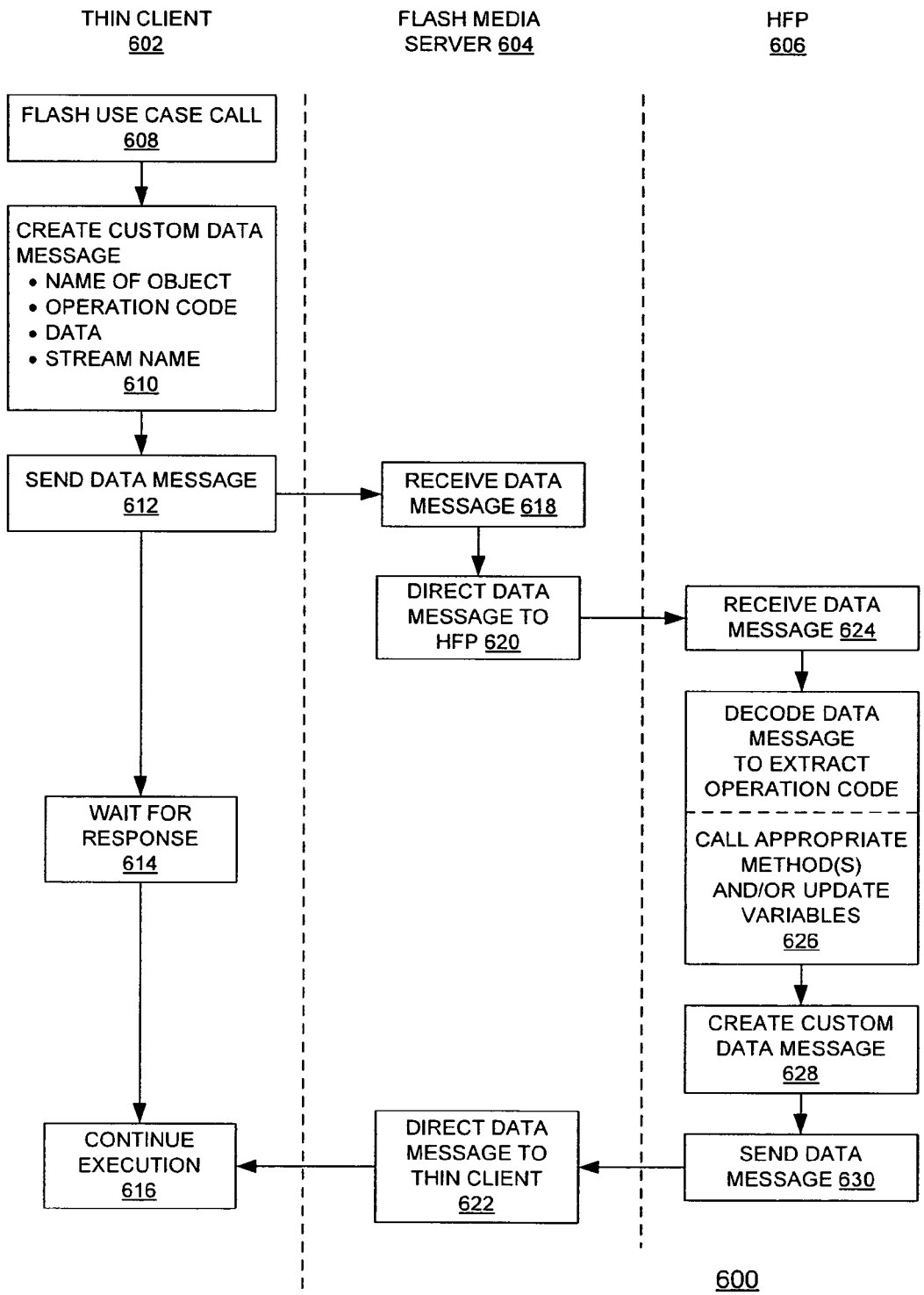
FIG. 6 depicts a flow diagram of an embodiment of a method of communicating a data message from a thin client of FIG. 1 to the HFP of FIG. 5.

FIG. 6 is a flow diagram of an embodiment of a method 600 of utilizing the embodiment of FIG. 5 where the display device thin client sends a message to the HFP and awaits a response. For clarity, the method 600 is arranged in three columns representing steps performed by the thin client (column 602), the FLASH media server (column 604), and the HFP (column 606). At step 608, the FLASH use case call (e.g., External Interface calls (JAVA script to ActionScript communications) are instantiated at the thin client). At step 610, the method 600 creates a custom data message comprising an object name, an operation code, data for the operation and a stream name (e.g., for RTMP support). At step 612, the method 600 sends the data message to the FLASH Media server (e.g., web server 106 of FIG. 1). The method 600 awaits a response at step 614.

At step 618, the FLASH media server receives the data message. At step 620, the data message is directed to an HFP (e.g., HFP 502 of FIG. 5). The HFP may be a component of the FLASH media server or may be located in a separate server (e.g., a multimedia assistance server 104 of FIG. 1). At step 624, the HFP receives the data message and, at step 626, the method 600 decodes the data message to extract the operation code and its related parameters. The method 600, in response to the extracted information, calls appropriate methods (operations) and updates any variables to facilitate execution of the methods, e.g., implementing a call from ActionScript to a browser and/or vice versa.

At step 628, the method 600 creates a custom data message comprising, for example, the results of any operation performed in step 626 (e.g., acknowledgements, variable updates, and/or the like). At step 630, the data message is sent to the FLASH media server, where, at step 622, the data message is directed to the thin client of the display device. Upon receipt of the data message at step 616, the thin client continues execution. In this manner, a call, such as for an external interface, occurring within the display device while remotely executing a SWF file can be handled through communicating data messages between the thin client and the HFP.

Figure 7:
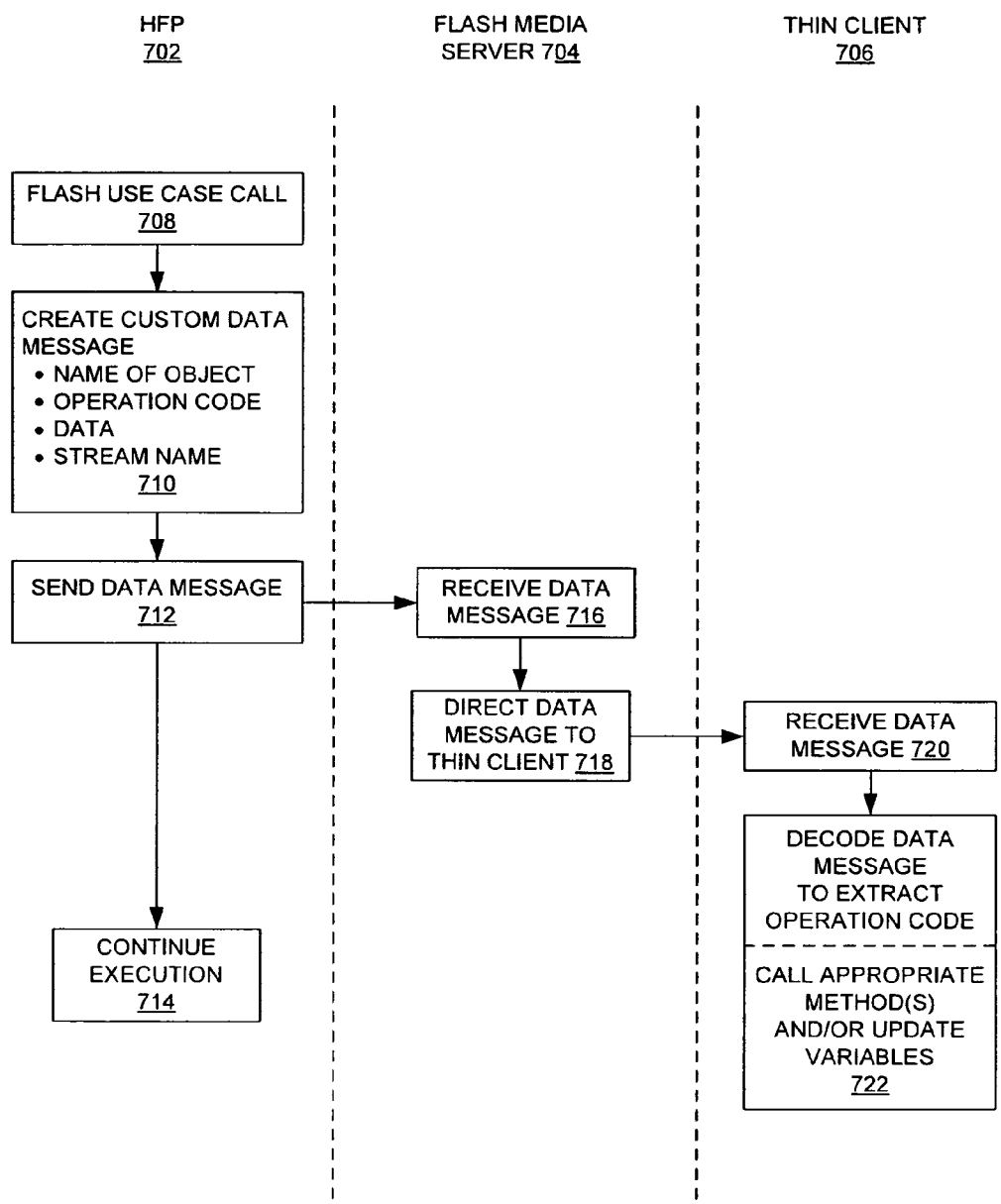
FIG. 7 depicts a flow diagram of an embodiment of a method of communicating a data message from the HFP of FIG. 5 to the thin client of FIG. 1.

FIG. 7 depicts a flow diagram of an embodiment of a method 700 of utilizing the embodiment of FIG. 5 where the HFP sends a message to the display device thin client to facilitate an operation on the display device. For clarity, the method 700 is arranged in three columns representing steps performed by the HFP (column 702), the FLASH media server (column 704), and the thin client (column 706). At step 708, a FLASH use case call is instantiated at the HFP to communicate certain call operations to the thin client to cause the thin client to perform a local operation that is required by remote execution of the SWF file. Examples of operations that may be called from an executed SWF file include operations involving Shared Objects and operations involving Local Connections. Shared Objects are data within FLASH content that is stored locally as a file—similar to "cookies" used by web browsers. Operations involving Shared Objects include: Clear (purges stored Shared Objects), Flush (writes Shared Objects) and GetLocal (fetches a required Shared Object). Local Connection operations are used to send instructions between two pieces of FLASH content within a single webpage. Local Connection operations include: Send (invokes a process to listen to a particular connection), Connect (listens to a particular connection name for instructions), Close (stops listening to a particular connection name). To create a user experience at the display device as if the FLASH Player software was executing locally, the HFP communicates necessary Shared Object and Local Connection operations (calls) to the thin client to implement locally. One embodiment of the communications process is represented by method 700. In one embodiment, the operations generally communicated from the HFP to the thin client for local execution comprise one or more of SharedObject.flush, SharedObject.clear, LocalConnection.connect. LocalConnection.send, LocalConnection.close and/or the like.

At step 710, the method 700 creates a custom data message comprising an object name, an operation code, data for the operation and a stream name (an RTMP parameter). At step 712, the method 700 sends the data message to the FLASH Media server (e.g., web server 106 of FIG. 1). The method 700 continues execution of the SWF file at step 714.

At step 716, the FLASH media server receives the data message. At step 718, the data message is directed to a thin client (e.g., thin client 122 of FIG. 1). At step 720, the thin client receives the data message and, at step 722, the method 700 decodes the data message to extract the operation code and its related parameters. The method 700, in response to the extracted information, calls appropriate methods (operations) and updates any variables to facilitate execution of the methods, e.g., implementing a local function involving shared objects or local connections. Since these are unidirectional calls, the thin client locally implements them without sending an acknowledgement or other response to the HFP.

Figure 8:
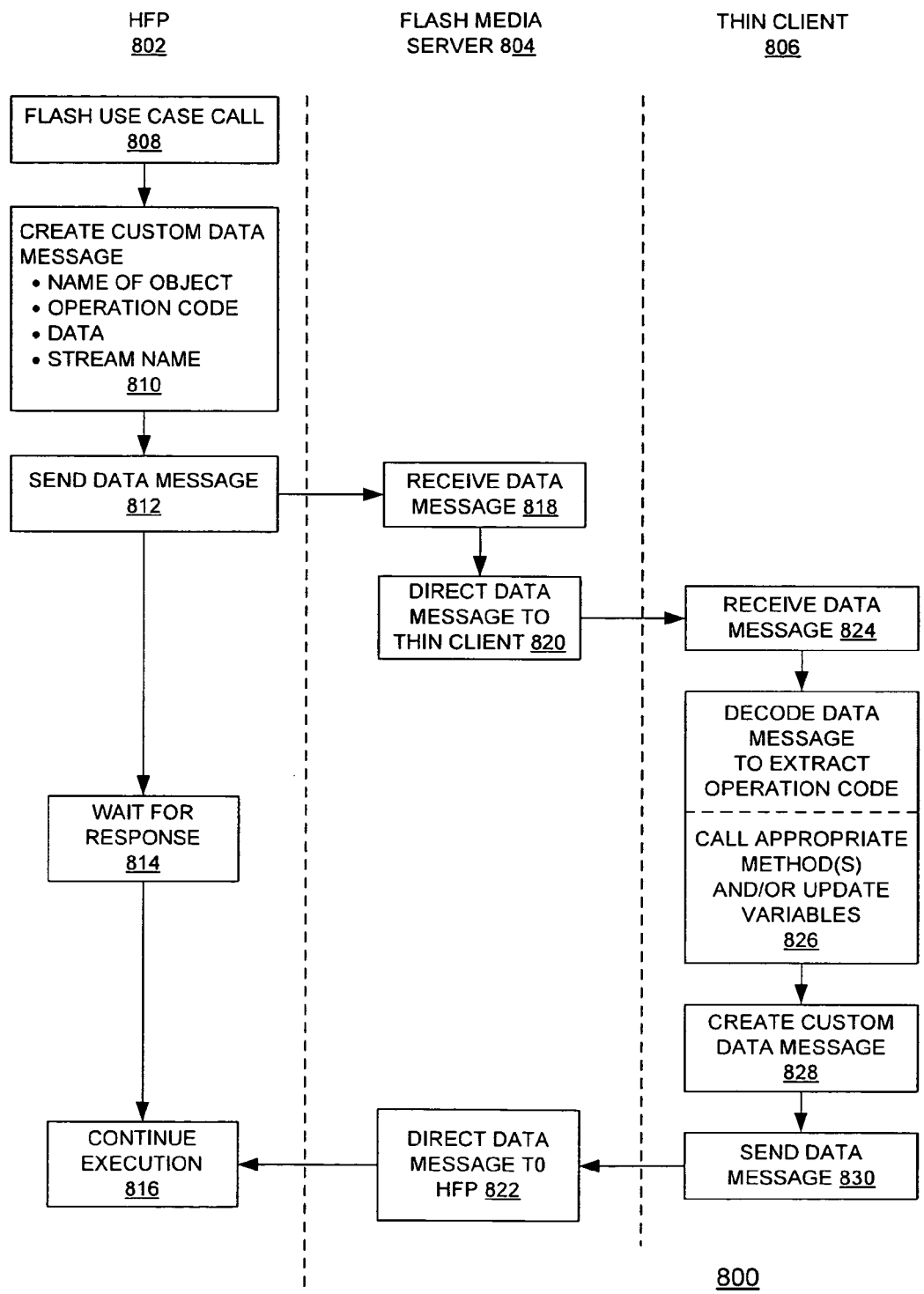
FIG. 8 depicts a flow diagram of another embodiment of a method of communicating a data message from the HFP of FIG. 5 to the thin client of FIG. 1.

FIG. 8 is a flow diagram of an embodiment of a method 800 of utilizing the embodiment of FIG. 5, where the HFP sends a message to the thin client and awaits a response. For clarity, the method 800 is arranged in three columns representing steps performed by the HFP (column 802), the FLASH media server (column 804), and the thin client (column 806). In this embodiment, the HFP requires information from the display device to enable the HFP to continue rendering the FLASH content to the frame buffer. Such instances arise in such operations as ShareObject.getLocal, System Date and Time calls, External Interface calls and/or the like. Specifically, a SharedObject.getLocal operation is used to fetch a Shared Object from the display device for use by the HFP, System Date and Time operations are performed by the thin client to ensure the HFP uses the display device local date and time as needed, and the External Interface operations are used as the counterpart to the communication in FIG. 6, here to communicate from the HFP to the thin client and receive information regarding an External Interface at the display device.

At step 808, the FLASH use case call is instantiated at the HFP to request and receive certain information necessary to proceed with remotely rendering FLASH content. At step 810, the method 800 creates a custom message comprising an object name, an operation code, data for the operation and a stream name. At step 812, the method 800 sends the data message to the FLASH Media server. The method 800 causes the HFP to await a response at step 814.

At step 818, the FLASH media server receives the data message. At step 820, the data message is directed to the display device. At step 824, the thin client of the display device receives the data message and, at step 826, the method 800 decodes the data message to extract the operation code and its related parameters. The method 800, in response to the extracted information, calls appropriate methods (operations) and updates any variables to facilitate execution of the methods, e.g., fetches a Shared Object or Date/Time information, At step 828, the method 800 creates a custom data message comprising, for example, the results of any operation performed in step 826 (e.g., acknowledgements, variable updates, and/or the like). At step 830, the data message is sent to the FLASH media server, where, at step 622, the data message is directed to the HFP of the multimedia assistance server. Upon receipt of the data message at step 816, the HFP continues execution and renders the FLASH content. In this manner, a call occurring within the HFP while remotely executing a SWF file can be handled through communicating data messages between the thin client and the HFP.

Figure 9:
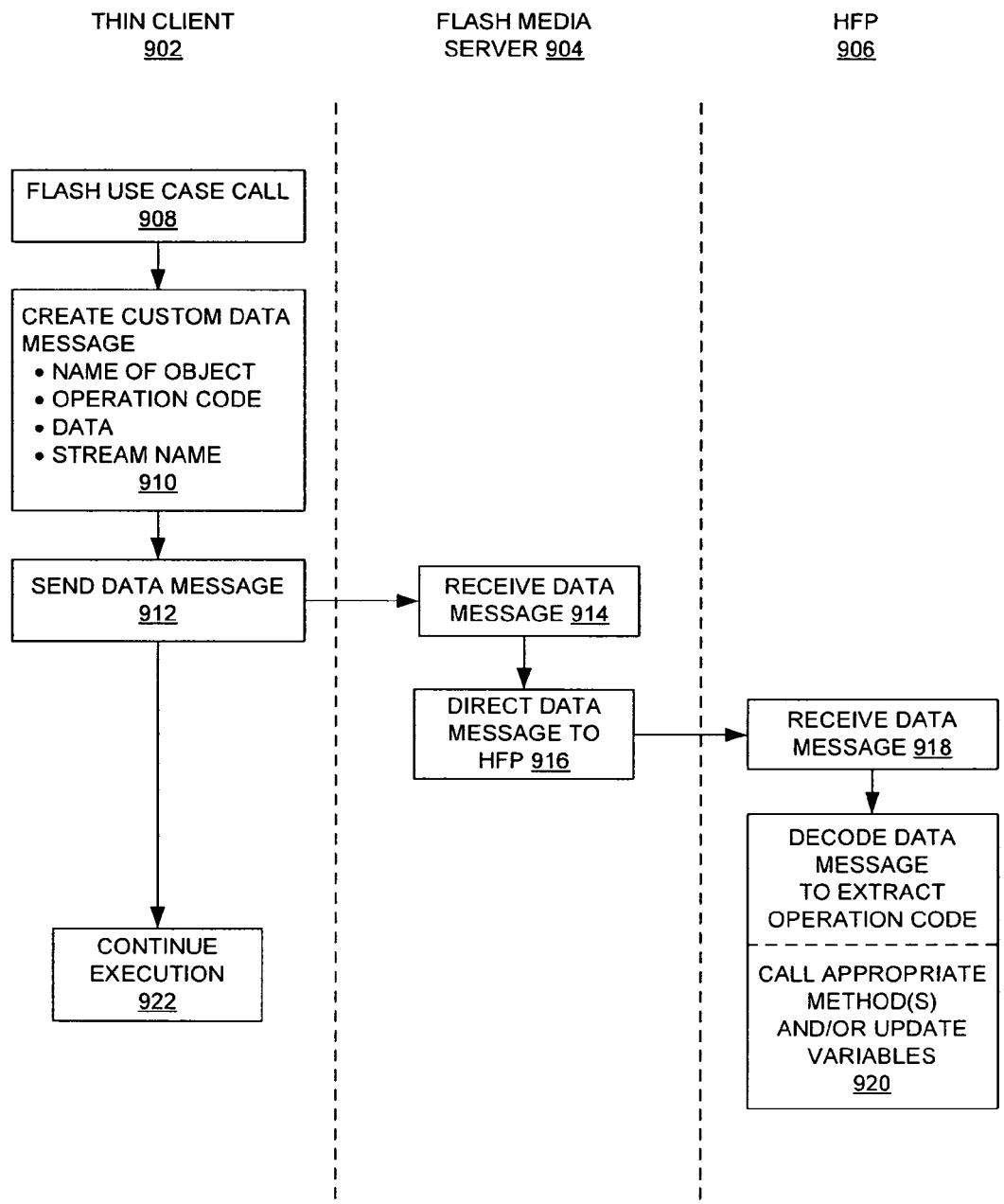
FIG. 9 depicts a flow diagram of another embodiment of a method of communicating a data message from a thin client of FIG. 1 to the HFP of FIG. 5.

FIG. 9 depicts a flow diagram of an embodiment of a method 900 of utilizing the embodiment of FIG. 5 where the thin client sends a message to the HFP to facilitate an operation on the HFP. For clarity, the method 900 is arranged in three columns representing steps performed by the thin client (column 902), the FLASH media server (column 904), and the HFP (column 906). At step 908, a FLASH use case call is instantiated at the thin client to communicate certain call operations to the HFP to cause the HFP to perform a remote operation that is required to facilitate remote execution of the SWF file. Examples of operations that may be called from the thin client include operations involving information transfer and operations involving Local Connections. Information transfer includes sending to the HFP: system capabilities, cookies, browser dependencies, interactivity events and/or the like. The HFP generally needs to know the system capabilities such as screen size, screen resolution, language and/or the like. Additionally, when the thin client identifies non-displayable content, the thin client communicates to the HFP using method 900 information that is needed for accurately rendering the FLASH content and creating an A/V sequence including, but not limited to, web browser cookies related to the FLASH content, FLASH content URL, FLASH object height and width within the web page, variables associated with the FLASH content (flashvars), base URL and scale mode. In addition, method 900 is used for communicating to the HFP interactivity events produced from mouse, keyboard, and other input interactions. Also, if the thin client receives a Local Connection operation from the browser or other display device resource, the Local Connection operation is sent to the HFP.

At step 910, the method 900 creates a custom message comprising an object name, an operation code, data for the operation and a stream name (an RTMP parameter). At step 912, the method 900 sends the data message to the FLASH Media server (e.g., web server 106 of FIG. 1). The method 900 causes the thin client to continue execution.

At step 916, the FLASH media server receives the data message. At step 918, the data message is directed to an HFP. At step 920, the HFP receives the data message and, at step 922, the method 900 decodes the data message to extract the operation code and its related parameters. The method 900, in response to the extracted information calls appropriate methods (operations) and updates any variables to facilitate execution of the methods, e.g., utilizing communicated information or implementing local connections or interactivity events. Since these are unidirectional operations, the HFP locally implements them without sending an acknowledgement or other response to the thin client.

Figure 10:
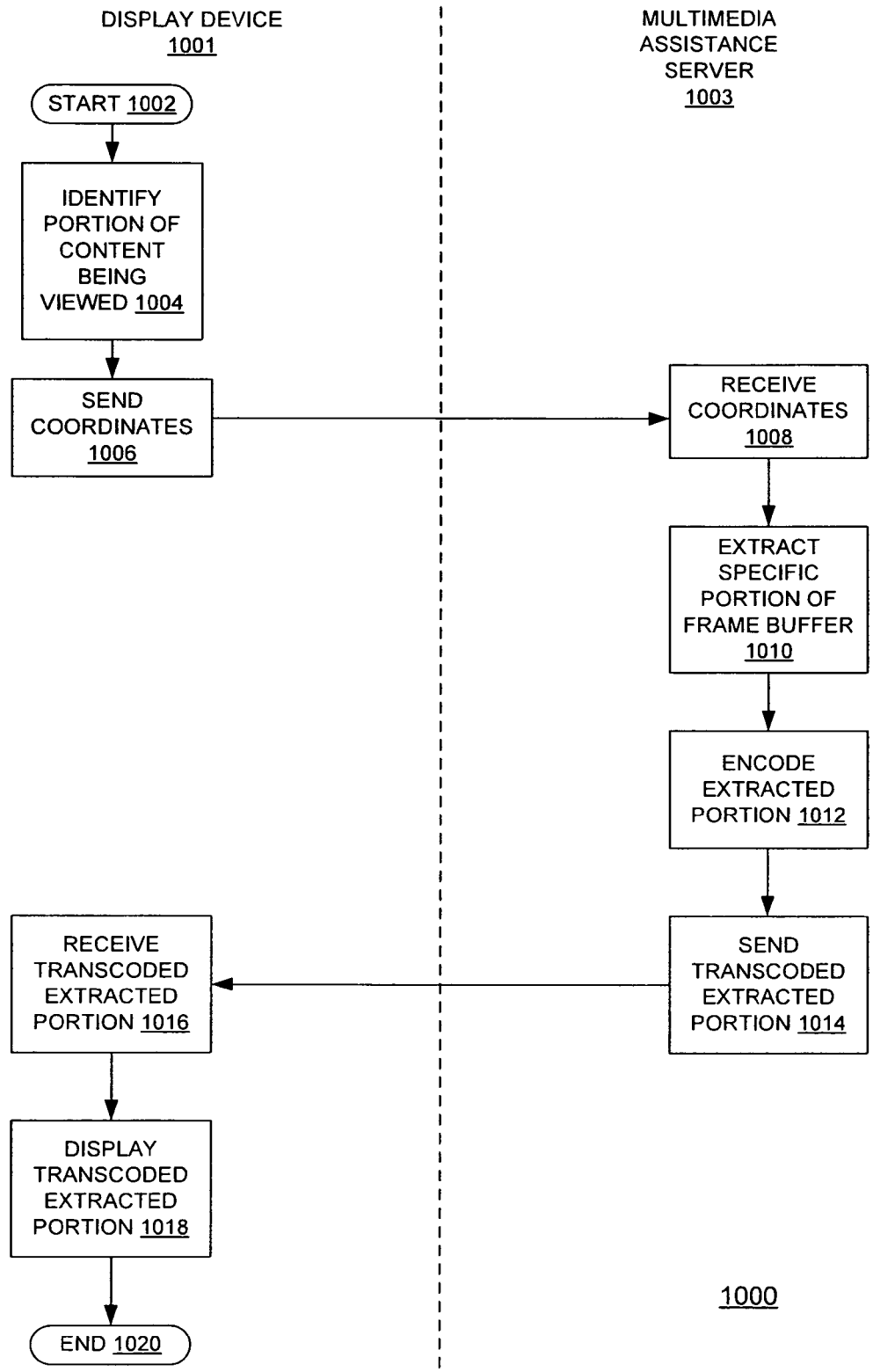
FIG. 10 depicts a flow diagram of a method of encoding select portions of multimedia content, according to one or more embodiments.

FIG. 10 is a flow diagram of a method 1000 for selectively encoding various portions of a content display with differing quality levels, according to one or more embodiments. To enhance the speed of the transcoding process, this embodiment only transcodes a portion of the content (the portion being viewed on the display device) at high quality. Other portions of the content not being viewed are either encoded at a lower quality (as described with reference to FIG. 11 below) or not at all. For clarity, operations performed by display device (e.g., display device 102 of FIG. 1) are depicted in column 1001, and operations performed by a multimedia assistance server (e.g., multimedia assistance server 104 of FIG. 1) are listed in column 1003.

The method starts at step 1002 and proceeds to step 1004, wherein the method 1000 identifies a portion of content being viewed. In an embodiment, the display device uses multimedia software (e.g., multimedia software 118 of FIG. 1) identifies a portion of content being viewed and, in general, the portion is a centrally located portion. At step 1006, the method 1000 sends coordinates of such a portion to the multimedia assistance server (e.g., pixel locations for corners of rectangle containing the portion). At step 1008, the multimedia assistance server receives the coordinates for the portion. At step 1010, the specific portion identified by the coordinates from a frame buffer is extracted. In an embodiment, the transcoder (e.g., transcoder 154 of FIG. 1 and embodiment thereof in FIG. 5) extracts the specific portion from the frame buffer. At step 1012, the transcoder encodes the extracted portion. In one embodiment, the video encoder 504 of FIG. 5 is controlled to only encode the specific portion at a first quality level (e.g., a high quality level). At step 1014, the encoded extracted portion is sent to the display device. At step 1016, the display device receives the encoded extracted portion. At step 1018, the display device decodes the encoded extracted portion and displays the content of the specific portion. The method ends at step 1020.

In this manner, the multimedia assistance server is encoding and transmitting only specific portion of the content that is being viewed by a user of the display device. In other words, the multimedia assistance server is able to selectively replace the non-displayable content in accordance with the display device computing capabilities, while optimizing the encoding and transmission process.

Figure 11:
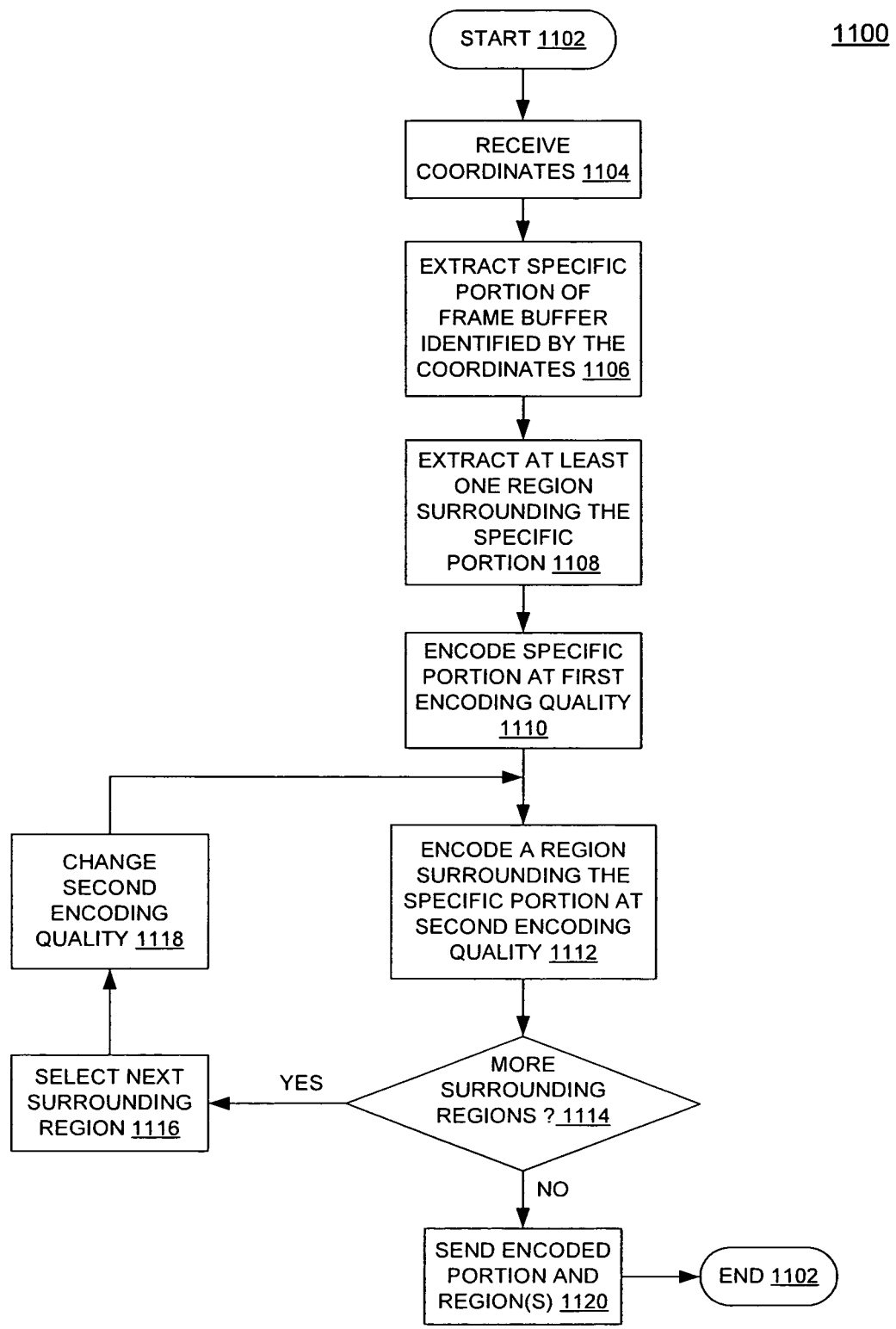
FIG. 11 depicts a flow diagram of a method of encoding select portions of multimedia content using varying quality levels, according to one or more embodiments.

FIG. 11 is a flow diagram of a method 1100 performed by a multimedia assistance server (e.g., the multimedia assistance server 104 of FIG. 1) to encode an extracted region of the non-displayable content using varying quality levels, according to one or more embodiments. The method starts at step 1102 and proceeds to step 1104, wherein the multimedia assistance server receives the coordinates of a specific portion of content that is viewed on the display device (e.g., display device 102 of FIG. 1). At step 1106, the method 1100 extracts a specific portion of the frame buffer (e.g., the frame buffer 136 of FIG. 1 or encoder 504 of FIG. 5) identified by the coordinates. At step 1108, the multimedia assistance server extracts the at least one region surrounding the specific portion. The specific size of the surrounding region is a design choice that may depend upon the encoder capabilities, the capabilities of the display device, the screen resolution of the display device and so on.

At step 1110, the specific portion is encoded at a first encoding quality, e.g., a highest level of resolution available. At step 1112, a region surrounding the specific portion is encoded at a second encoding quality. In an embodiment, the first encoding quality is of a higher quality than a quality of the second encoding quality, e.g., the first quality is of higher resolution than the second quality. The quality level is established via a quality parameter that can be set by a service provider (e.g., an administrator of the multimedia assistance server). The A/V encoders are controlled to establish the quality levels, e.g., through control of bits per pixel, sampling rates, quantization levels, and/or the like.

At step 1114, the method 1100 determines whether there are more surrounding regions to be encoded. If the method 1100 determines that there exist more surrounding regions (option "YES"), the method 1100 proceeds to step 1116. At step 1116, a next surrounding region is selected using the coordinates of the region. At step 1118, the second encoding quality is changed (e.g., to a lower quality than previously used). The method proceeds to step 1112 to encode the region.

At step 1114, if the method 1100 determines that there are no additional surrounding regions to be encoded (option "NO"), the method 1100 proceeds to step 1120. At step 1120, encoded portions and region(s) are sent to the display device for rendering. In an embodiment, the encoded portions and region(s) are sent by a thin client interface (e.g., thin client interface 130 of FIG. 1) to a thin client (e.g., thin client 122 of FIG. 1) within the display device. The multimedia software displays the encoded portions and region(s) on the display device. The method proceeds to step 1122, where the method 1100 ends.

In this manner, the non-displayable content is rapidly transcoded because not all the content is transcoded at a high quality. As the user may pan or scroll the content within a viewing region, the transcoding process encodes the central portion at a higher quality while displaying the lower quality surrounding content until the "new" central portion of transcoded content is available for display.

Figure 12:
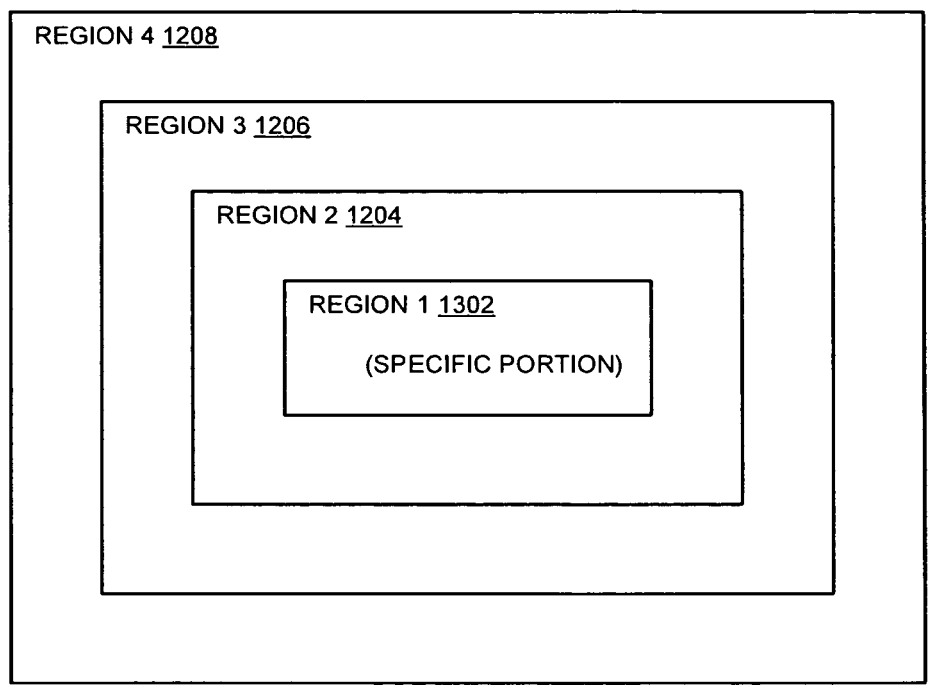
FIG. 12 is a schematic diagram of a specific portion and corresponding surrounding regions to be encoded using the method of FIG. 11, according to one or more embodiments.

FIG. 12 illustrates a schematic diagram of a specific portion and the surrounding regions as they are encoded using the method 1100 of FIG. 11, according to one or more embodiments. The diagram 1200 includes a region 1 surrounded by a region 2, a region 3, a region 4 and so forth. The region 1 corresponds to a specific portion of content that is viewed by the user of a display device (e.g., display device 102 of FIG. 1). In this manner, the specific portion that is being viewed is encoded at a first encoding quality and sent as high quality multimedia data, while the surrounding regions (such as the region 2, the region 3, so forth) are each encoded at a lower encoding quality and sent as lower quality multimedia data.

This enables the multimedia assistance server (e.g., multimedia assistance server 104 of FIG. 1) to expend resources to provide the highest quality for the portion being viewed. When the user scrolls or pans or otherwise changes the viewed content, the transcoder will update the quality of the region as the region moves into becoming the specific portion. Further, this technique enhances the efficiency of the server, reduces bandwidth utilized in transmitting the multimedia data, increases the speed of decoding at the display device, and enhances the overall user experience.

Example Web Server, or the Multimedia Assistance Server, or the Display Device

Figure 13:
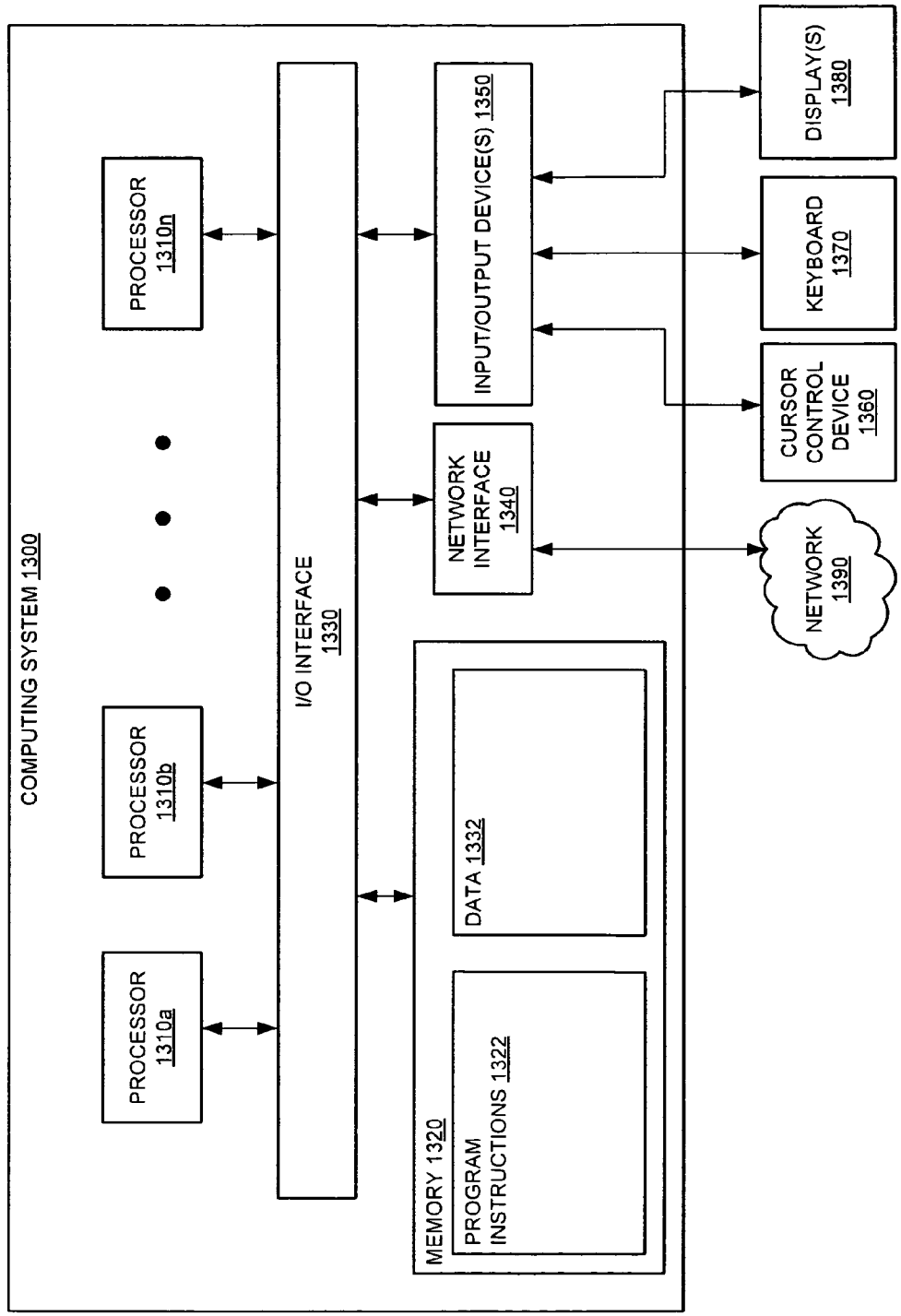
FIG. 13 is a block diagram of a computing system that can be used as a web server, a multimedia assistance server or a display device, according to one or more embodiments.

FIG. 13 is a block diagram of a computing system 1300 that can be generally configured for use as the web server 106, the multimedia assistance server 104 or the display device 102, according to one or more embodiments.

Various embodiments of a method and apparatus for displaying multimedia content on a display device, as described herein, may be executed on one or more display devices, the web server, and the multimedia assistance server that may interact with various other devices. The general structure of computing system 900 may form the hardware platform for one or more display devices, the web server, and the multimedia assistance server as illustrated by FIG. 13, which may in various embodiments implement any of the elements or functionality illustrated in FIGS. 1-8. In various embodiments, the system 1300 may be configured to display multimedia content described above. While the illustrated system 1300 may be used to implement any other system, device, element, functionality or method of the above-described embodiments. In the illustrated embodiments, system 1300 may be configured to implement the display device software in memory 114 of Figures, multimedia assistance server software in memory 128 of FIG. 1, and/or web server software in memory 142 of FIG. 1 as processor-executable executable program instructions 1322 (e.g., program instructions executable by processor(s) 1310) in various embodiments.

In the illustrated embodiment, the system 1300 includes one or more processors 1310 coupled to a device memory 1320 via an input/output (I/O) interface 1330. The system 1300 may further include a network interface 1340 coupled to I/O interface 1330, and one or more input/output devices 1350, such as cursor control device 1360, keyboard 1370, and display(s) 1380. In various embodiments, the software may utilize any of components 1360-1380. In various embodiments, a user interface may be generated and displayed on display 1380. In some cases, it is contemplated that embodiments may be implemented using a single instance of the system 1300, while in other embodiments multiple such devices make up the system 1300, may be configured to host different portions or instances of various embodiments. For example, in one embodiment some elements may be implemented via one or more devices of the system 1300 that are distinct from those devices implementing other elements. In another example, multiple devices may implement the system 1300 in a distributed manner.

In different embodiments, the system 1300 may form various types of display devices, including, but not limited to, a mobile phone, a Personal Digital Assistant (PDA), laptop, notebook, or netbook computer, handheld computer, a camera, a set top box, a consumer device, video game console, handheld video game device, or in general any type of computing or electronic device having limited computing resources. In other embodiments, the system 1300 may for various types of servers to implement the web server 106 of FIG. 1 and/or the multimedia assistance server 104 of FIG. 1.

In various embodiments, the system 1300 may be a uniprocessor device including one processor 1310, or a multiprocessor device including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

Device memory 1320 may be configured to store program instructions 1322 (e.g., specifically, depending on the configuration, software in memories 114, 128 and/or 142) and/or data 1332 (e.g., specifically, depending on the configuration, software in memories 114, 128 and/or 142) accessible by processor 1310. In various embodiments, device memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within device memory 1320. In other embodiments, program instructions and/or data may be received, sent or stored upon different types of computer-accessible media or on similar media separate from device memory 1320 or the system 1300.

In one embodiment, I/O interface 1330 may be configured to coordinate I/O traffic between processor 1310, device memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one components (e.g., device memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to device memory 1320, may be incorporated directly into processor 1310.

Network interface 1340 may be configured to allow data to be exchanged between the system 1300 and other devices attached to a network (e.g., network 1390), such as one or more external devices. In various embodiments, network 1390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more the system 1300. Multiple input/output devices 1350 may be present in the system 1300. In some embodiments, similar input/output devices may be separate from the system 1300 and may interact with one or more display devices 1300 through a wired or wireless connection, such as over network interface 1340.

In some embodiments, the illustrated computing system may implement any of the methods described above, such as the methods illustrated by the flowcharts of FIGS. 2-7. In other embodiments, different elements and data may be included.

Those skilled in the art will appreciate that the system 1300 is merely illustrative and is not intended to limit the scope of embodiments. In particular, the display device and devices may include any combination of hardware or software that can perform the indicated functions of various embodiments, including computers, network devices, Internet appliances, PDAs, wireless phones, pagers, etc. The system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated display device via intercomputer communication. Some or all of the device components or data structures may also be stored (e.g., as instructions or structured data) on a computer-accessible medium or a portable article to be read by an appropriate drive, various examples of which are described above. In some embodiments, instructions stored on a computer-accessible medium separate from the system 1300 may be transmitted to the system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed; and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for displaying multimedia content comprising:

receiving a web page comprising multimedia content for display upon a display device, wherein the webpage comprises displayable content and non-displayable content;

detecting non-displayable content within the multimedia content of the webpage on the display device by identifying a specific portion of the non-displayable content decoded from the multimedia content;

encoding of the specific portion at a first quality level and an encoding of at least one region of content surrounding the specific portion at a second quality level, where the first quality level is higher than the second quality level;

requesting, from a remotely located multimedia assistance server, transcoding for the non-displayable content;

receiving, from the remotely located multimedia assistance server, the multimedia data transcoded from the non-displayable content as the multimedia data is transcoded;

displaying the web page on the display device using content decoded from the multimedia data to replace the non-displayable content as the content is decoded;

while displaying the displayable content during receiving of the transcoded multimedia data, enabling a plurality of interaction events; and in response to receiving a user interaction event, communicating the at least one user interaction event to alter the transcoding of the non-displayable content on the remotely located multimedia assistance server to interactively control the display of the multimedia content on the display device.

2. The method of claim 1, further comprising utilizing at least one proxy layer to communicate at least one of information or at least one operation from the display device to the multimedia assistance server that is necessary for performing transcoding of the non-displayable content.

3. The method of claim 1, further comprising capturing at least one interactive event that effects displaying of the content decoded from the multimedia data and communicating the captured at least one interactive event to a multimedia assistance server that is transcoding the non-displayable content.

4. The method of claim 1, wherein the multimedia data comprises an encoded audio/video frame sequence.

5. The method of claim 1, wherein the non-displayable content comprises a SWF file and the multimedia data comprises an encoded audio/video frame sequence.

6. A non-transitory computer readable storage medium for storing software that, when executed by a computing system, causes the computing system to perform:

receiving a web page comprising multimedia content for display upon a display device, wherein the webpage comprises displayable content and non-displayable content;

detecting non-displayable content within the multimedia content of the webpage on the display device by identifying a specific portion of the non-displayable content decoded from the multimedia content;

encoding of the specific portion at a first quality level and an encoding of at least one region of content surrounding the specific portion at a second quality level, where the first quality level is higher than the second quality level;

requesting, from a remotely located multimedia assistance server, transcoding of the non-displayable content;

receiving, from the remotely located multimedia assistance server, displayable content generated based on the transcoding of the non-displayable content;

displaying the web page on the display device while displaying at least one interaction event; and communicating the at least one interaction event to the remotely located multimedia assistance server to interactively control the display of the displayable content created from the transcoding of the non-displayable content.

7. The non-transitory computer readable storage medium of claim 6 for storing software that, when executed by a computing system, causes the computing system to further perform utilizing at least one proxy layer to communicate at least one of information or at least one operation from the display device to a multimedia assistance server that is necessary for performing transcoding of the non-displayable content.

8. The non-transitory computer readable storage medium of claim 6 for storing software that, when executed by a computing system, causes the computing system to further perform capturing at least one interactive event that effects displaying of the content decoded from the multimedia data and communicating the captured at least one interactive event to a multimedia assistance server that is transcoding the non-displayable content.

9. The non-transitory computer readable storage medium of claim 6 for storing software that, when executed by a computing system, causes the computing system to further perform, identifying a specific portion of the content decoded from the multimedia data.

10. The non-transitory computer readable storage medium of claim 9, wherein the multimedia data comprises an encoding of the specific portion.

11. The non-transitory computer readable storage medium of claim 6, wherein the multimedia data comprises an encoded audio/video frame sequence.

12. The non-transitory computer readable storage medium of claim 6, wherein the non-displayable content comprises a SWF file and the multimedia data comprises an encoded audio/video frame sequence.

13. Apparatus for displaying multimedia content comprising:

a remotely located display device for detecting non-displayable content within the multimedia content of the webpage on the display device by identifying a specific portion of the non-displayable content decoded from the multimedia content;

a multimedia assistance server for receiving a request to transcode non-displayable content from a remotely located display device, wherein the multimedia assistance server comprises:

a transcoder for receiving the non-displayable content and encoding of the specific portion at a first quality level and an encoding of at least one region of content surrounding the specific portion at a second quality level, where the first quality level is higher than the second quality level, transcoding the non-displayable content into multimedia data having a format of displayable content on a frame buffer, the transcoder is adapted for receiving at least one user interaction event of a plurality of enabled user interaction events from the display device to control transcoding of the non-displayable content to interactively manipulate the display of multimedia content on the display device during receiving of the transcoded multimedia data based on the display capabilities of the display device; and an interface for coupling the multimedia data to the remotely located display device that created the request for transcoding.

14. The apparatus of claim 13 further comprising a remotely located display device for detecting non-displayable within a web page and requesting transcoding for the non-displayable content from the multimedia assistance server.

15. The apparatus of claim 14 wherein the display device receives the multimedia data, decodes the multimedia data and displays displayable content contained in the multimedia data within the web page in place of the non-displayable content.

16. The apparatus of claim 15 further comprising at least one proxy layer for capturing at least one interaction event associated with displaying the non-displayable content, coupling the at least one interaction event to the multimedia assistance server for use during transcoding of the non-displayable.

* * * * *